United States Patent [19]

Young

[11] 4,030,771

[45] June 21, 1977

[54] VEHICLE BRAKING SYSTEM

[75] Inventor: Alastair John Young, Leamington Spa, England

[73] Assignee: Automotive Products Limited

[22] Filed: May 25, 1976

[21] Appl. No.: 689,842

[30] Foreign Application Priority Data

June 5, 1975 United Kingdom ............ 24329/75
Oct. 15, 1975 United Kingdom ............ 42118/75

[52] U.S. Cl. .............................. 280/88; 180/104; 188/152
[51] Int. Cl.² ...................................... B60T 8/24
[58] Field of Search ......... 180/103 BF, 104, 82 R; 188/192, 152; 303/21 CG; 280/DIG. 1, 88

[56] References Cited

UNITED STATES PATENTS

| 2,152,123 | 3/1939 | Williams | 180/104 X |
| 2,209,149 | 7/1940 | Briand | 280/88 X |
| 2,331,214 | 10/1943 | Milster | 280/88 X |
| 3,706,352 | 12/1972 | Ferguson | 180/103 BF |

Primary Examiner—Joseph F. Peters, Jr.
Assistant Examiner—Terrance L. Siemens
Attorney, Agent, or Firm—Kemon & Estabrook

[57] ABSTRACT

A motor vehicle with conventional spring suspension has a valve which is connected to the suspension on either side of the vehicle through springs so that when the vehicle rolls during cornering the valve is biassed in one direction or the other. The valve controls braking to the front wheels of the vehicle so that in a corner the inboard wheel is braked less than the outboard wheel.

7 Claims, 8 Drawing Figures

VEHICLE BRAKING SYSTEM

The invention relates to a fluid pressure braking system for a vehicle having a resilient suspension system, the braking system being of a kind which compises a driver-controlled source of fluid pressure, a first fluid pressure modulating valve interposed between the driver-controlled source and a first brake actuator which operates a brake acting on a first wheel which is on one side of the vehicle, a second fluid pressure modulating valve interposed between the drive-controlled source and a second brake actuator which operates a brake acting on a second wheel which is on the other side of the vehicle and a control mechanism responsive to vehicle suspension movements during cornering to modify the performance of one of the modulating valves so that any pressure which acts in the brake actuator associated with the inboard of said first and second wheels is lower than any pressure which acts in the brake actuator associated with the outboard of said first and second wheels.

It is an object of the invention to provide a fluid pressure braking system of the kind referred to above which incorporates a control mechanism which can be conveniently installed on a motor vehicle.

Accordingly, in a fluid pressure braking system of the kind referred to, the control mechanism comprises a valve loading element which is associated with the two modulating valves and a cross-linkage for linking first and second components of the vehicle suspension system, the first suspension component moving with vertical movement of the first wheel relative to the vehicle body during vehicle cornering and the second suspension component moving with vertical movement of the second wheel relative to the vertical body during vehicle cornering, the cross-linkage including a first spring interposed between the first suspension component and the valve loading element and a second spring interposed between the second suspension component and the valve loading element, the arrangement being such that the cross-linkage provides a controlling biassing load on the valve loading element which is proportional to and in the same sense as differences in the vertical positions, relative to the vehicle body, of the first and second wheels.

The two fluid pressure modulating valves may each be pressure intensifier valves, or pressure reducing valves and may operate in an air or a hydraulic braking system. In a hydraulic braking system the reducing valves may be of a kind which is usually referred to as a cut-off valve but which, in a braking system of the kind referred to, operates in a somewhat different manner to the cut-off valves which are already well known in vehicle hydraulic braking systems owing to the interaction between the two valves.

A preferred embodiment of the invention in which cut-off type valves are used includes the pressure modulating valves in a valve unit which comprises a housing, first and second inlet ports for connection to the driver-controlled source, a first outlet port for connection to the first brake actuator, a first non-return valve capable of blocking communication from the first inlet port to the first outlet port, a first chamber within the housing connected to the first inlet port through the first non-return valve and to the first outlet port, a second outlet port for connection to the second brake actuator, a second non-return valve capable of blocking communication from the second inlet port to the second outlet port, a second chamber within the housing connected to the second inlet port through the second non-return valve and to the second outlet port, a bore in the housing, a first plunger positioned in the bore to define a wall of the first chamber and movable by the valve loading element in a direction which decreases the volume of the first chamber and unseats the first non-return valve, and a second plunger positioned in the bore to define a wall of the second chamber and movable by the valve loading element in a direction which decreases the volume of the second chamber and unseats the second non-return valve, the plungers being arranged and dimensioned such that when the valve loading element exerts no biassing load on either plunger the plungers are in mutual abutment and in a normal position in which both non-return valves are unseated, but when the first plunger is moved by the valve loading element away from the normal position to decrease the volume of the first chamber the second plunger can move with the first plunger to increase the volume of the second chamber and allow the second non-return valve to seat and when the second plunger is moved by the valve loading element away from the normal position to decrease the volume of second chamber the first plunger can move with the second plunger to increase the volume of the first chamber and allow the first non-return valve to seat.

Some embodiments of the invention will now be described by way of example and with reference to the accompanying drawings, of which.

Figure 1:
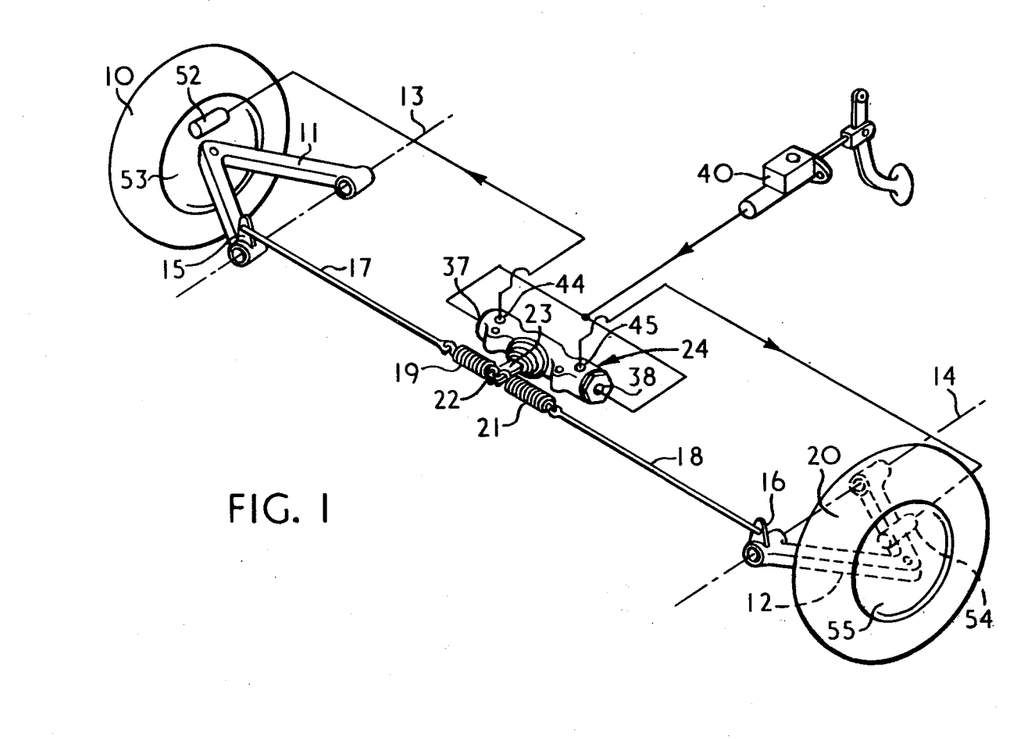
FIG. 1 is a diagrammatic perspective view of a first embodiment of a braking system according to the invention.
Figure 2:
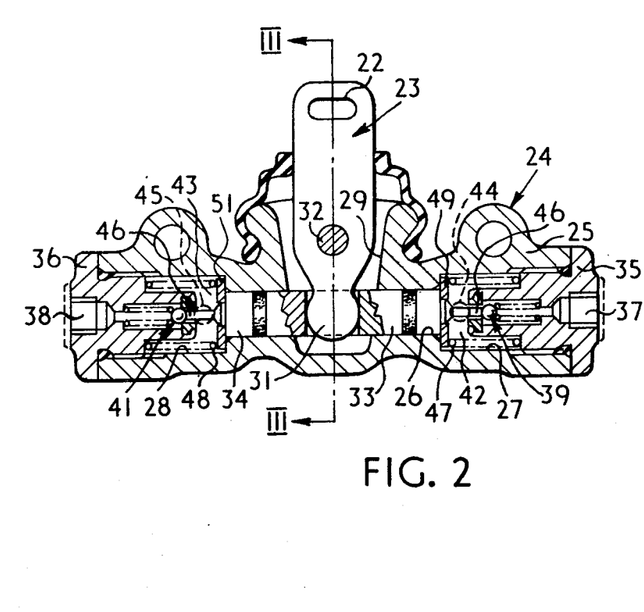
FIG. 2 is a plan cross-section through a valve unit shown in FIG. 1 and which incorporates cut-off type valves.
Figure 3:
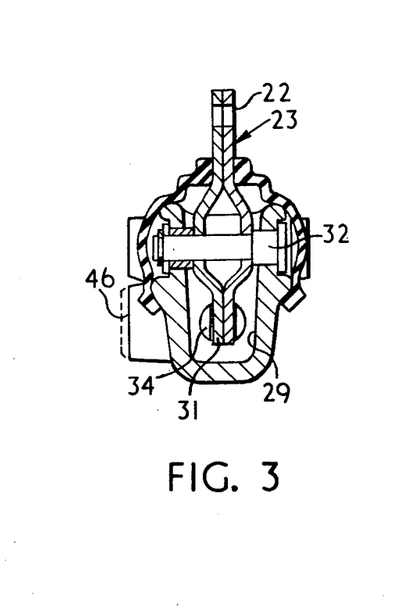
FIG. 3 is a cross-section on the line III—III of FIG. 2.

Referring to FIGS. 1–3, a motor vehicle has a conventionally sprung front suspension including a right hand (as viewed by the driver) wishbone arm 11 and a left hand wishbone arm 12. Wishbone 11 pivots about an axis 13 on the vehicle body and similarly the wishbone 12 pivots about an axis 14 on the vehicle body. Springs and wheel hubs (not shown) are attached to each wishbone so that wishbone 11 is connected to a first front wheel 10 and the wishbone 12 is connected to a second front wheel 20. The arrangement is such that when the weight supported by each front wheel 10, 20 is increased the associated wishbone 11, 12 pivots upwards from its normal, generally horizontal position. The wishbone 11 has a crank arm 15 extending generally vertically from one of its pivot ends, wishbone 12 having a similar arm 16 extending in the same manner.

The wishbones 11, 12 constitute first and second suspension components respectively which are linked by a cross-linkage which includes a rod 17 pivoted about one of its ends to the crank arm 15 and a similar rod 18 pivoted about one of its ends to the crank 16. The other ends of the rods 17, 18 are linked by a pair of tension springs 19, 21 which are themselves joined by the slotted end portion 22 of a lever 23 projecting from a valve unit 24.

The valve unit 24 includes a cast housing 25 with a stepped bore comprising a small diameter central bore 26 and two larger diameter end bores 27, 28. The bore 26 is interrupted by a cast-in pocket 29 which accommodates the lever 23. Lever 23 is in two parts spot-welded together and pivots in the housing 25 on a pin 32 to act as a valve operating element for the valve unit 24. Each half of the bore 26 accommodates a plunger 33, 34, the adjoining ends of the plungers being slotted to accommodate the rounded end 31 of the lever 23. The slots are deep enough to allow the ends of the plungers to abut.

The outer ends of the large diameter bores 27, 28 are each sealed by a respective screwed plug 35, 36. Each plug 35, 36 is drilled to provide first and second inlet ports, 37, 38 respectively and houses a respective non-return valve 39, 41, both inlet ports 37, 38 being connected to a driver-controlled hydraulic master cylinder 40. Each non-return valve comprises a ball spring-loaded towards an annular valve seat at the end of the plug 35, 36 further from the inlet port 37, 38.

The plut 35 and bore 27 together with the adjacent end of plunger 33 define a first chamber 42 and similarly plug 36 and bore 28 together with the adjacent end of plunger 34 define a second chamber 43. A first outlet port 44 connected to a brake actuating wheel cylinder 52 of a first brake 53 acting on the first front wheel 10 opens into the first chamber 42 and a second outlet port 45 connected to a brake actuating wheel cylinder 54 of a second brake 54 acting on the second front wheel 20 opens into the second chamber 43. Each plunger 33, 34 has a projecting nose 46, the plungers 33, 34 being so dimensioned that when they abut each other the respective projecting nose 46 unseats the ball of the adjacent non-return valve 39, 41. This is the normal position of the plungers 33, 34 and to help them to remain in this position two biassing springs 47, 48 are positioned in the chambers 42, 43, each spring 47, 48 bearing against a respective washer 49, 51. The plungers 33, 34 are dimensioned so that when each is in its normal position the shoulder between the portion which slides in the bore 26 and the projecting nose 46 is aligned with the step formed between the small diameter bore 26 and the respective large bore 27, 28. Hence any tendency for the plunger 33 to move to the right of FIG. 2 is resisted by the spring 47 and any tendency for the plunger 34 to move to the left of FIG. 2 is resisted by the spring 48.

The crank arms 15, 16, rods 17, 18, and springs 19, 21 provide a controlling biassing load on the lever 23 which is proportional to and in the same sense as differences in the suspension travels. The lengths of the rods 17, 18 are such that when the wishbones 11, 12 are in their full bump positions there is a small tension preload in each of the springs 19, 31. This ensures that springs 19 and 21 remain in tension for all suspension travels.

When the vehicle is driven in a straight line the vertical movements of the front wheels 10, 20 are substantially equal and in the same sense, thus the loads in the cross-linkage are balanced and the lever 23 exerts no biassing load on either of the plungers 33, 34.

If the vehicle corners to the left, the load supported by the left hand wheel 20 becomes lighter and the load supported by the right hand wheel 10 becomes heavier. Hence the wishbones 12 tends to move downwards and the wishbone 11 tends to move upwards. Assuming no movement of the lever 23, the tension in the spring 21 is increased and tension in the spring 19 is reduced and hence the slotted end 22 of the lever 23 is biassed towards the left of the vehicle, i.e. towards the left of FIG. 2. This in turn biases the plunger 33 towards the right of FIG. 2. If there is no pressure from the master cylinder 40 at the inlet ports 37, 38, the plunger 33 will move to the right of FIG. 2 against the compression of centralising spring 47, decreasing the volume of the first chamber 42. Plunger 34 can move with plunger 33 to increase the volume of the second chamber 43 and allow the non-return valve 41 to seat, blocking communication between the inlet port 38 and the outlet port 45. If pressure from the master cylinder 40 is then supplied while the vehicle is still cornering to the left, pressure at inlet port 37 will reach the chamber 42 through the open non-return valve 39 and will be transmitted to the right hand wheel cylinder 52 through the port 44, whilst pressure at inlet port 38 is blocked by non-return valve 41 and cannot reach the chamber 43 or be communicated to the left hand wheel cylinder 54 through port 45. This is only a transient condition however, because pressure in the chamber 42 acts on plunger 33 to move the plunger 33 and the other plunger 34 back towards the left of FIG. 2 against the biassing load of lever 23 until the non-return valve 41 is nudged open. This allows hydraulic fluid into the chamber 43 and out through port 45 to the left hand brake. The non-return valve 41 remains open until the pressure in chamber 43 is such that the forces on the plunger 33 caused by pressure in chamber 42 and biassing spring 47 in the one direction are balanced by the load from plunger 34 caused by pressure in chamber 43 in the other direction. If master cylinder pressure is increased further, pressure in chamber 42 rises so that plungers 33 and 34 again move back towards the left of FIG. 2 and open the non-return valve 41 to allow a further quantity of hydraulic fluid into the chamber 43, thus increasing the pressure in the chamber 43 and restoring the balance on plunger 33. If the master cylinder pressure is reduced, the corresponding reduction in pressure in chamber 42 allows the plungers 33, 34 to move to the right of FIG. 2 increasing the volume of chamber 43. Since non-return valve 41 is shut, this reduces the pressure to the left hand front brake by an amount which maintains the balance on plunger 33. Although lever 23 moves during movement of plunger 33, its movement alters the net biassing load from springs 19, 21 by a relatively insignificant amount.

If the brakes are already applied when the vehicle enters the left hand corner, a biassing load is applied by lever 23 to the plunger 33 as before. Plunger 33 is moved to the right allowing plunger 34 to also move to the right, closing non-return valve 41 and increasing the volume of hydraulic fluid in chamber 43. This reduces the pressure to the left hand brake until the forces on the plunger 33 balance.

A reduction in master cylinder pressure below the left hand brake pressure in chamber 43 causes nonreturn valve 41 to open and allow fluid to return to the master cylinder. The use of separate plungers 33, 34 ensures that no direct biassing load is exerted on plunger 33 when the lever 23 is moved clockwise (in relation to FIG. 2) or on plunger 34 when the lever 23 is moved anticlockwise so that there is no tendency for a vacuum to develop in either chamber 42 or 43.

Because the valve unit 24 and the cross-linkage are symmetrical, operation of the valve unit and cross-linkage during right hand cornering is exactly similar to that described above for left hand cornering. The centralising springs 47, 48 have a degree of fitted preload to prevent the valve from operating when small differences in the front wheel positions occur, such as arises when travelling in a straight line on moderately bumpy roads. This helps to avoid wear of the valve components. The direct abutment of the plungers 33, 34 ensures that the normal position of each plunger 33, 34 is maintained throughout the service life of the valve unit and is unaffected by any wear of the lever 23. This is a critical safety consideration, since it is essential that no wear should take place which would allow both non-return valves 39 and 41 to be seated together and prevent braking when the vehicle is travelling straight ahead.

Figure 4:
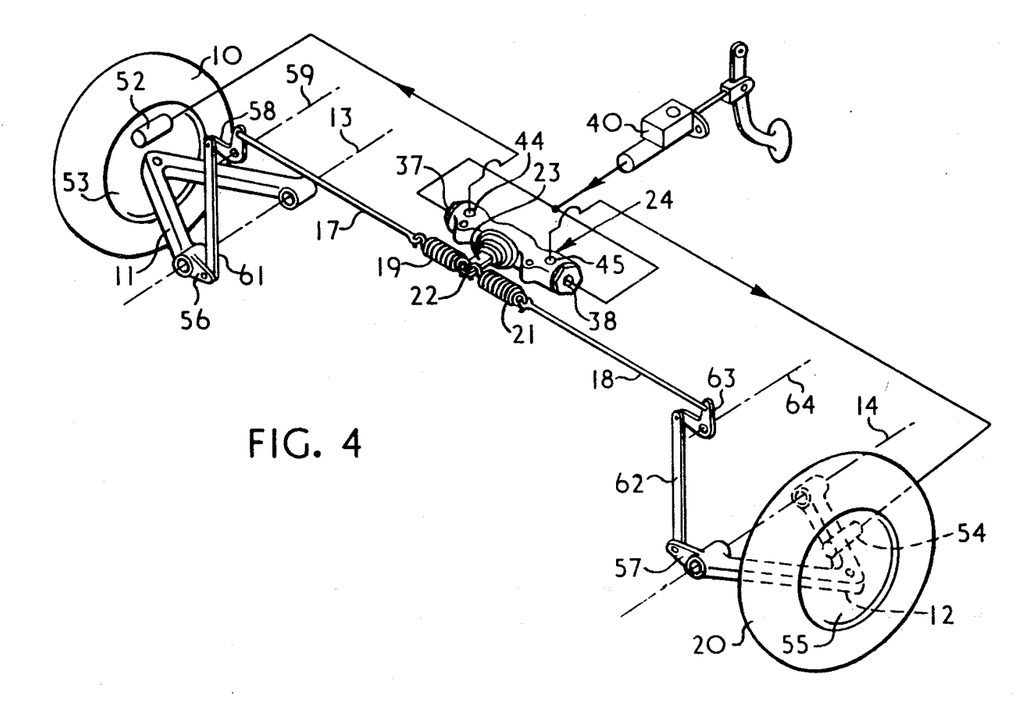
FIG. 4 is a diagrammatic perspective view showing a modification to the braking system shown in FIG. 1.

FIG. 4 shows a modification to the braking system shown in FIG. 1. The valve unit 24 described with particular reference to FIGS. 2 and 3 is unchanged and where appropriate identical references to those shown in FIG. 1 are used in FIG. 4.

The wishbone 11 has a crank arm 56 extending generally horizontally from one of its pivot ends and wishbone 12 has a similar crank arm 57. Crank arm 56 is connected through a vertical link 61 to one, generally horizontal, arm of a bell crank 58 which pivots on the vehicle body about an axis 59 parallel to the wishbone axis 13. Similarly, crank arm 57 is connected through a vertical line 62 to one, generally horizontal, arm of another bell crank 63 which pivots on the vehicle body about an axis 64 parallel to the wishbone axis 14. The other, generally vertical, arm of the bell crank 58 is connected to the outer end of rod 17 and the other, generally vertical, arm of the bell crank 63 is connected to the outer end of rod 18. The arrangement is such that the vertical arm of the bell crank 58 behaves in the same manner as the crank arm 15 shown in FIG. 1 and the vertical arm of the bell crank 63 behaves in the same manner as the crank arm 16 shown in FIG. 1. The modification gives a greater freedom of choice in installing the valve unit 24 on the vehicle.

The second embodiment of the invention utilises an identical cross-linkage to that shown in and described with reference to FIG. 1 so that where appropriate identical references are used with the addition of 100.

Figure 5:
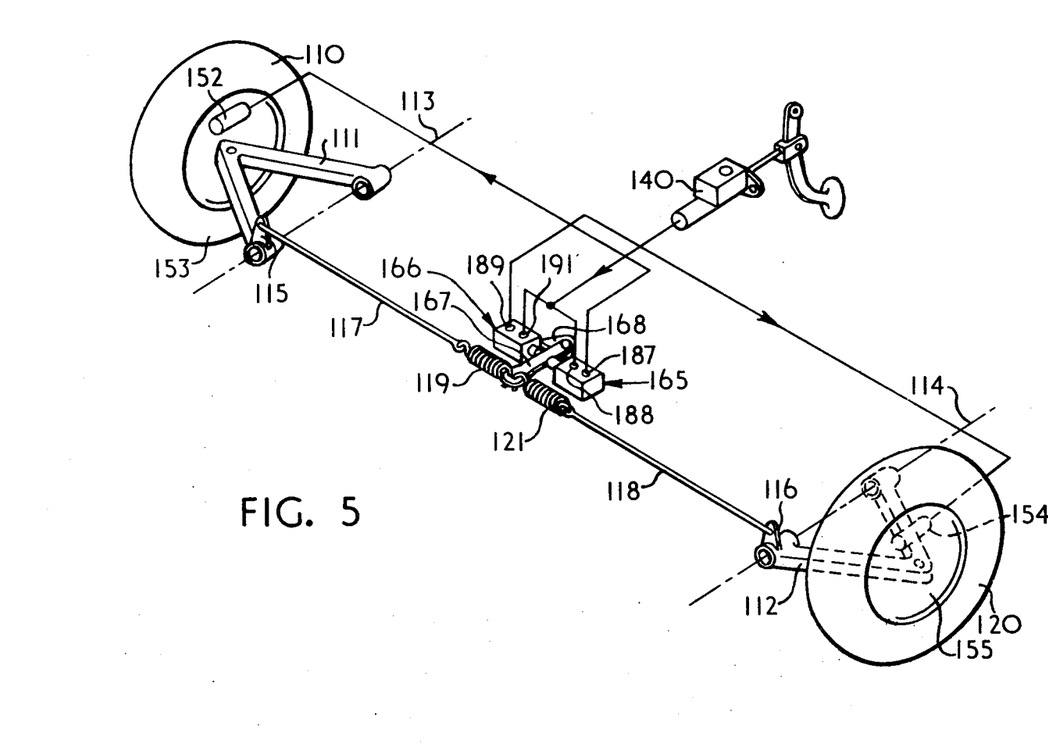
FIG. 5 is a diagrammatic perspective view similar to FIG. 1, of a second embodiment of a braking system according to the invention.
Figure 6:
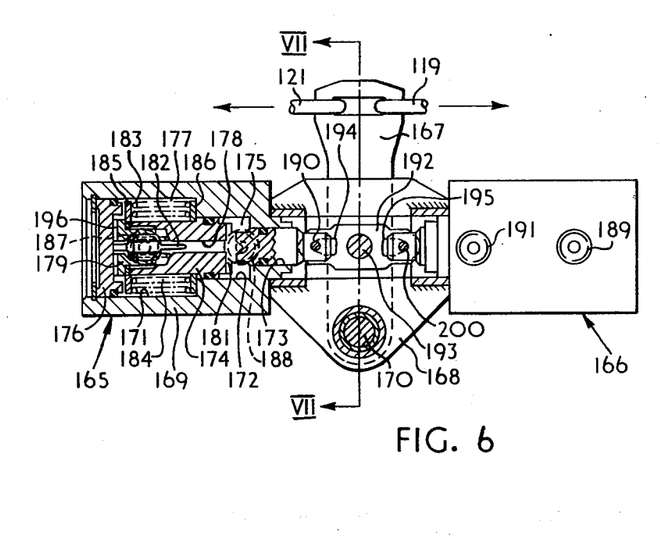
FIG. 6 is a scrap plan view of two pressure modulating valves shown in FIG. 5, with one of the valves shown sectioned.
Figure 7:
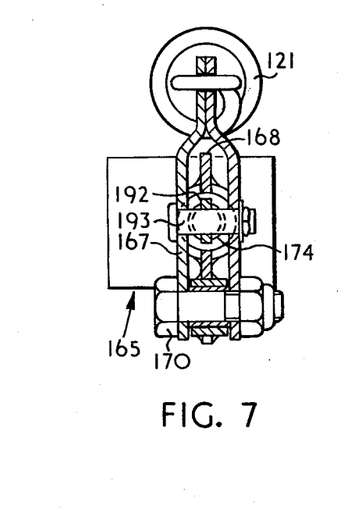
FIG. 7 is a cross-section on the line VII-VII of FIG. 6.

Referring to FIGS. 5–7, a valve loading element associated with a first pressure modulating valve 165 of the reducing type and a second, identical, reducing valve 166 comprises a bifurcated lever 167. The forked end of the lever 167 is pivoted on a bracket 168 by a bolt 170 and the other end is slotted to link the tension springs 119, 121 of the cross-linkage.

The first reducing valve 165 comprises a housing 169 welded to the bracket 168. A stepped bore in the housing 169 comprises a large diameter portion 171, a medial diameter bore portion 172 and a small diameter bore portion 173. A stepped diameter plunger 174 is slidable in the medial diameter bore portion 172 and the small diameter bore portion 173 to define, with the housing 169, a first chamber 175 and, with a plug 176 closing the large diameter bore portion 171, a second chamber 177. The plunger 174 has an axial stepped bore 178 which is screw threaded at the end nearer the plug 176 to receive a valve seat member 179 and which opens into a transverse drilling 181 at the other end. A valve member 182 in the axial bore 178 is spring loaded towards the plug 176 but is prevented from seating on the valve seat member 179 when the plunger 174 is in the position shown in FIG. 6 where it abuts the plug 176 by virtue of the valve member 182 itself abutting the plug 176. The plunger 174 is biassed towards the plug 176 by two preloaded concentric helical compression springs 183, 184, which act on the seat member 179 through a washer 185 and react on the housing 169 through another washer 186.

The first chamber 175 is connected to the master cylinder 140 through a port 187 and the second chamber 177 is connected to the front right hand wheel cylinder 152 through a port 188. The other valve 166 has a port 189 corresponding to port 187 of the valve 165 and also connected to the master cylinder 140, and a port 191 corresponding to port 188 of the valve 165 and connected to the front left hand wheel cylinder 154.

The end of plunger 174 further from the plug 176 is slotted to receive part of a flat link 192 which is pivoted to the arms of lever 167 by a pin 193. Two slots 194, 195 in the link 192 receive pins 190, 200 in the plunger 174 and the corresponding plunger of valve 166 respectively. The arrangement is such that when lever 167 is rotated clockwise relative to FIG. 6 it acts through the link 192 to exert a pull on plunger 174 of valve 165 and bias it away from the plug 187 whilst the link 192 moves freely in the slotted end of the corresponding plunger of valve 166. Similarly, when lever 167 is rotated anti-clockwise, the link 192 moves freely in the end of plunger 174 of valve 165 and biasses the corresponding plunger of valve 166 towards the valve 165.

The cross-linkage comprising rods 117, 118, springs 19, 21 and the lever 167 is arranged in a similar manner to that in the first embodiment of the invention so that when the vehicle is driven in a straight line and the vertical movements of the front wheels 110, 120 are substantially equal and in the same sense, the lever 167 exerts no biassing on either the plunger 174 of valve 165 or the corresponding plunger of valve 166.

If the brakes are applied while the vehicle is travelling in a straight line, pressure from the master cylinder 140 is transmitted to wheel cylinder 152 through port 187, chamber 177, grooves 196 in the end face of valve seat member 179, past the unseated valve member 182 and through the bore 178 and drilling 181 into chamber 175 and out through port 188. The pressure in the chambers 177, 175 acts on the plunger 174 over an effective piston area corresponding to the small diameter bore 173 to create a force which is tending to overcome the preload of springs 183, 184 and to move the plunger 174 away from the plug 176. However, the size of the preload is such that the valve member 182 does not seat until a relatively high pressure corresponding to a retardation of about 0.7g is reached. Thereafter the load on the plunger 174 acting against the load of springs 183, 184 is provided by the brake pressure at port 187 in chamber 177 acting on a piston area corresponding to the medial diameter bore 172, less the master cylinder pressure at port 188 in chamber 175 acting on an annular piston area corresponding to the difference in sectional area between the medial diameter bore 172 and the small diameter bore 173. Pressure in chamber 177 thus is reduced compared with pressure in chamber 175 to maintain this force balance, the plunger 174 shuttling to seat and unseat valve member 182 while pressure is increasing, and moving away from plug 176 while pressure is decreasing in the known manner of brake pressure reducing valves of this general type.

If the vehicle corners to the right, the tension in the spring 119 is increased and the tension in the spring 121 is decreased so that there is a net load on lever 167 tending to rotate it clockwise relative to FIG. 6. This puts a load on the plunger 174 of valve 165 which is tending to move it away from the plug 176 and which is acting against the preload of springs 183, 184. The relative stiffness of the springs 119, 121 and the geometry of the cross-linkage is such that if the brakes are off as the vehicle enters the corner, then plunger 174 will not move sufficiently against the preload of springs 183, 184 to seat valve member 182. If the brakes are applied whilst in the corner, the plunger moves as described above for the straight-ahead condition, but starts to reduce brake pressure at a much lower value of master cylinder pressure, the value depending on the degree of vehicle body roll.

If the vehicle is braked in a straight line and then put into a right hand corner, the plunger 174 is moved away from the plug 176 (irrespective of whether the valve has started to reduce pressure to the wheel cylinder 152) to increase the volume of chamber 177 and reduce pressure to the wheel cylinder 152 until the loads on plunger 174 are balanced. During the cornering to the right, valve 166 operates as for straight-ahead braking.

Since the cross-linkage is symmetrical and valve 166 is identical to valve 165, cornering to the left affects pressure to the left wheel cylinder 154 in a manner corresponding to that described above for right hand cornering.

Figure 8:
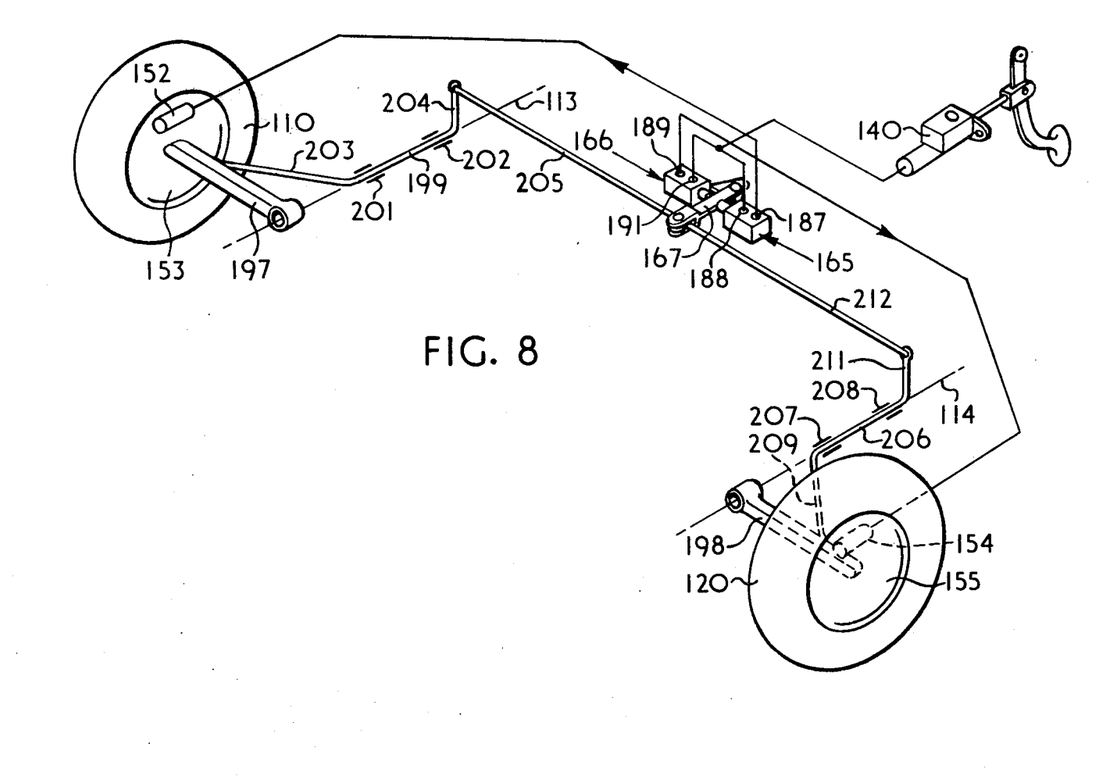
FIG. 8 is a diagrammatic perspective view showing a modification to the braking system shown in FIG. 5.

FIG. 8 shows a modification to the braking system shown in FIG. 5. The valves 165, 166 described with particular reference to FIGS. 6 and 7 are unchanged and where appropriate identical references to those shown in FIG. 5 are used in FIG. 8.

Wheel 110 is connected to a suspension arm 197 which pivots on the vehicle body about the axis 113 and corresponds to wishbone 111 and wheel 120 is connected to a suspension arm 198 which pivots on the vehicle body about the axis 114 and corresponds to wishbone 112. A cross-linkage between arms 197, 198 includes a torsion bar 199 aligned with axis 113 and journalled to the vehicle body by bearings 201, 202. An arm 203 at one end of torsion bar 199 is connected to suspension arm 198 so that it swivels about the same axis 113 with the suspension arm 198. The other end of the torsion bar 119 has an arm 204 disposed generally vertically and connected to the lever 167 through a rod 205. A similar torsion bar 206 is aligned with axis 114 and journalled to the vehicle body by bearings 207, 208. Arm 209 connects one end of torsion bar 206 to suspension arm 198 and arm 211 connects the other end to lever 167 through a rod 212.

The cross-linkage including torsion bars 199, 206 and rods 205, 212 may be set to give a small tensile preload in the rods 212 when the wheels 110, 120 are in their full bump positions, which will ensure that the rods 205, 212 remain in tension during all other suspension movements, but, provided the rods 205, 212 will withstand the compressive loads without buckling, the linkage can be adjusted to give any preload provided that lever 167 is centralised to put no biassing load on either valve 165 or 166 when the vehicle is not cornering.

Cornering to the right (relative to the driver) causes suspension arm 197 to move downwards relative to the vehicle body and arm 198 to move upwards, so that rods 205, 212 are tending to move to the right, relative to the driver. Hence lever 167 is biassed anti-clockwise in the same manner as before.

In each of the embodiments described above, and in the modifications described, the suspension components which operate the cross-linkage are associated with the same pair of wheels as are controlled by the pressure modulating valves. However, in further modifications to the arrangements described, the cross-linkages are directly connected to rear suspension components of the vehicle whilst the modulating valves control the front wheels. During vehicle cornering the rear wheels experience the same differences, side to side, in their vertical positions relative to the vehicle body as the front wheels, so that the controlling biassing load on the valve loading lever is proportional and in the same sense as differences in the vertical positions, relative to the vehicle body, of the front wheels whose braking is controlled by the modulating valves.

I claim:

1. In a vehicle having a body supported by a resilient suspension system, a first wheel on one side of the vehicle and a second wheel on the other side of the vehicle, a first suspension component which moves with vertical movement of the first wheel relative to the vehicle body during vehicle cornering and a second suspension component which moves with vertical movement of the second wheel relative to the vehicle body during vehicle cornering, a fluid pressure braking system which comprises:

a driver-controlled source of fluid pressure;
a first brake operative to brake said first wheel;
a second brake operative to brake said second wheel;
a first brake actuator acting on said first brake;
a second brake actuator acting on said second brake;
a first fluid pressure modulating valve connected between the driver-controlled source and said first brake actuator;
a second fluid pressure modulating valve connected between the driver-controlled source and said second brake actuator;
and a control mechanism responsive to vehicle suspension movements during vehicle cornering to modify the performance of one of the modulating valves so that any pressure which acts in the brake actuator associated with the inboard of said first and second wheels is lower than any pressure which acts in the brake actuator associated with the outboard of said first and second wheels, said control mechanism comprising a valve loading element operable on each of said modulating valves and a cross-linkage including a first spring connecting the valve loading element to said first suspension component and a second spring connecting the valve loading element to said second suspension component to provide a controlling biassing load on the valve loading element which is proportional to and in the same sense as differences in the vertical positions, relative to the vehicle body, of the first and second wheels.

2. The invention of claim 1 wherein the valve loading element comprises a lever.

3. The invention of claim 1 wherein said first and second springs are tension springs which are preloaded to remain in tension during all movements of said first and second suspension components.

4. The invention of claim 1 wherein said first and second springs are torsion bars.

5. The invention of claim 1 wherein each of the fluid pressure modulating valves comprises a housing, a stepped bore in the housing, a stepped plunger slidable in the stepped bore and defining therewith first and second chambers, the first chamber being connected to said source of fluid pressure and the second chamber being connected to the respective one of said first and second brake actuators, a first, annular, piston area on the plunger exposed to pressure in the first chamber to bias the plunger in one direction, a second piston area on the plunger to bias the plunger in the other direction, a preloaded spring biassing the plunger in said one direction and valve means which are open to allow fluid from the first chamber to the second chamber when the source pressure is below a predetermined value and closed to prevent fluid flowing from the first chamber to the second chamber when the plunger moves in said other direction beyond a datum position, the valve loading element acting on one of said valves to reduce the total spring load on the plunger during vehicle cornering.

6. The invention of claim 5 wherein the total spring load on the plunger of the other of the fluid pressure modulating valves remains unchanged during vehicle cornering.

7. The invention of claim 1 wherein the pressure modulating valves are included in a valve unit which comprises a housing, first and second inlet ports for connection to the driver-controlled source, a first outlet port for connection to the first brake actuator, a first non-return valve capable of blocking communication from the first inlet port to the first outlet port, a first chamber within the housing connected to the first inlet port through the first non-return valve and to the first outlet port, a second outlet port for connection to the second brake actuator, a second non-return valve capable of blocking communication from the second inlet port to the second outlet port, a second chamber within the housing connected to the second inlet port through the second non-return valve and to the second outlet port, a bore in the housing, a first plunger positioned in the bore to define a wall of the first chamber and movable by the valve loading element in a direction which decreases the volume of the first chamber and unseats the first non-return valve, and a second plunger positioned in the bore to define a wall of the second chamber and movable by the valve loading element in a direction which decreases the volume of the second chamber and unseats the second non-return valve, the plungers being arranged and dimensioned such that when the valve loading element exerts no biassing load on either plunger the plungers are in mutual abutment and in a normal position in which both non-return valves are unseated, but when the first plunger is moved by the valve loading element away from the normal position to decrease the volume of the first chamber the second plunger can move with the first plunger to increase the volume of the second chamber and allow the second non-return valve to seat and when the second plunger is moved by the valve loading element away from the normal position to decrease the volume of the second chamber the first plunger can move with the second plunger to increase the volume of the first chamber and allow the first non-return valve to seat.

* * * * *